June 24, 1952 B. W. KEESE 2,601,297
POWER TRANSMITTING MECHANISM
Filed Nov. 29, 1945 3 Sheets-Sheet 1

Inventor
Beverly W. Keese
By Strauch & Hoffman
Attorneys

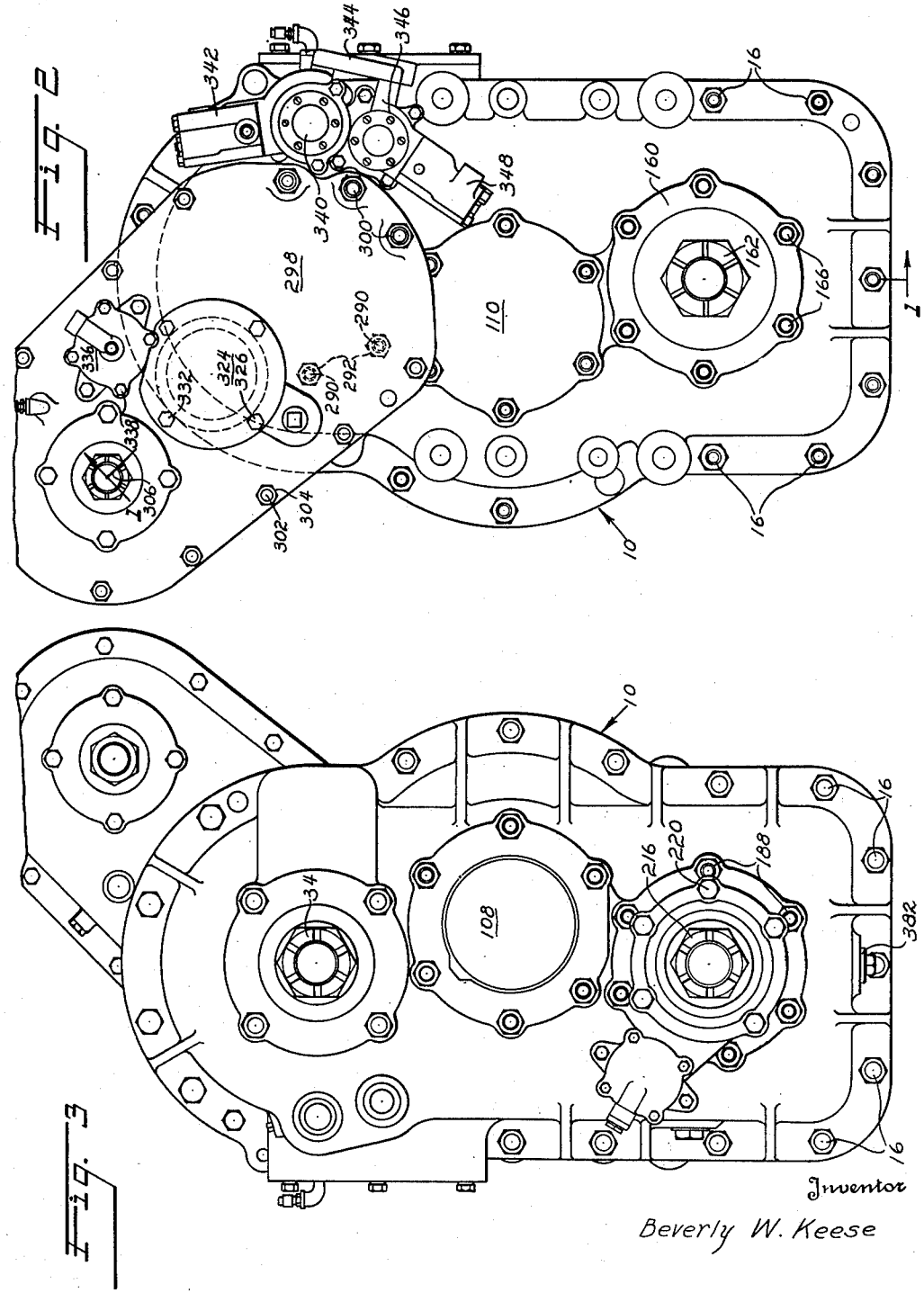

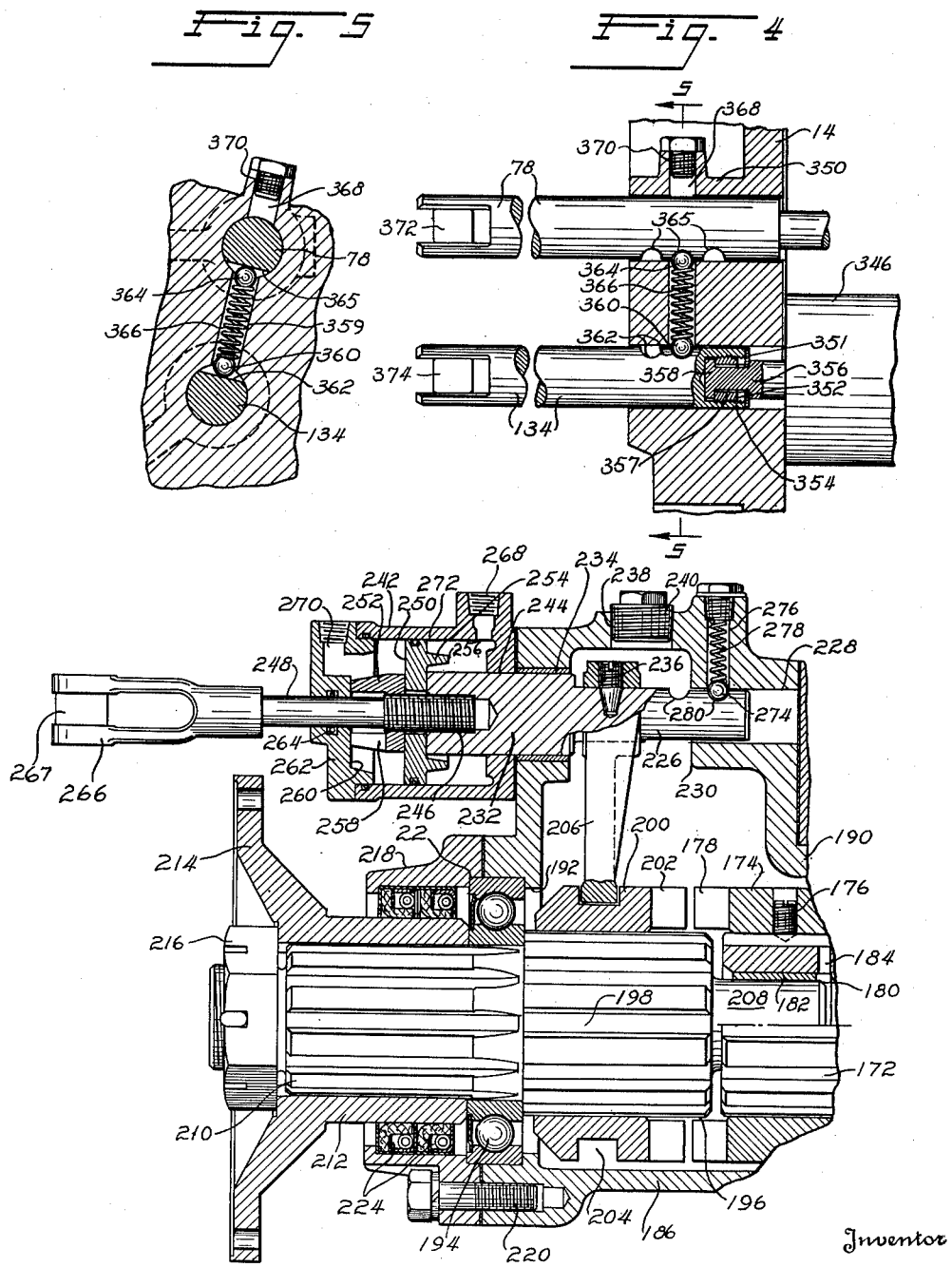

Patented June 24, 1952

2,601,297

UNITED STATES PATENT OFFICE 2,601,297

POWER TRANSMITTING MECHANISM

Beverly W. Keese, Oshkosh, Wis., assignor to The Timken-Detroit Axle Company, Detroit, Mich., a corporation of Ohio Application November 29, 1945, Serial No. 631,636

14 Claims. (Cl. 74—359)

This invention relates to an improved power transfer case for motor vehicles and has for its general object and purpose to provide a novel transfer case construction having improved means operable with ease and facility for transmitting power from the input to the output shaft of the transfer case at any one of several selective driving speed ratios.

It is a more particular object of the invention to provide a transfer case having direct, overdrive and underdrive power transmission means between the input and output shaft, with clutch devices of improved design for establishing the selected driving speed which may be easily and noiselessly operated either manually or by remotely controlled fluid pressure operated means.

Another object of the invention is to provide a multispeed drive power transfer case with power take-off means in a compactly assembled unit, together with means for driving the power take-off shaft from the power input shaft independently of the speed selecting clutch devices and the power transmission gear train.

It is a further object of the invention to provide a novel mounting of the clutch fork shifter rods with detent means for retaining the same in shifted position and means for connecting said rods to the fluid pressure operated means which will compensate for misalignment.

An additional object of the invention is to provide a novel clutch operating unit associated with the power output shaft and an axle drive shaft to actuate the movable clutch member under differential pressures to its engaged and disengaged positions respectively.

It is also the aim and purpose of my present invention to provide a power transfer case for motor vehicles as above characterized, in which the several cooperating elements are of simple, rugged and durable structural forms and will efficiently function with minimum maintenance expense.

With the above and other subordinate objects in view, the invention comprises the improved power transfer case, and the construction and relative arrangement of the several parts thereof, as will hereinafter be more fully described, illustrated in the accompanying drawings and subsequently incorporated in the subjoined claims.

In the drawings wherein I have disclosed one simple and practical embodiment of my present invention, and in which similar reference characters designate corresponding parts throughout the several views:

Figure 2 is an elevation of one end of the transfer case;

Figure 3 is a similar view of the opposite end thereof;

Figure 4 is a fragmentary vertical section illustrating a preferred connecting means between the fluid pressure actuated pistons and the clutch fork shifter rods;

Figure 5 is a transverse sectional view taken substantially on the line 5—5 of Figure 4; and Figure 6 is a fragmentary vertical section on an enlarged scale showing the front axle drive shaft disconnected from the power output shaft.

Figure 1:
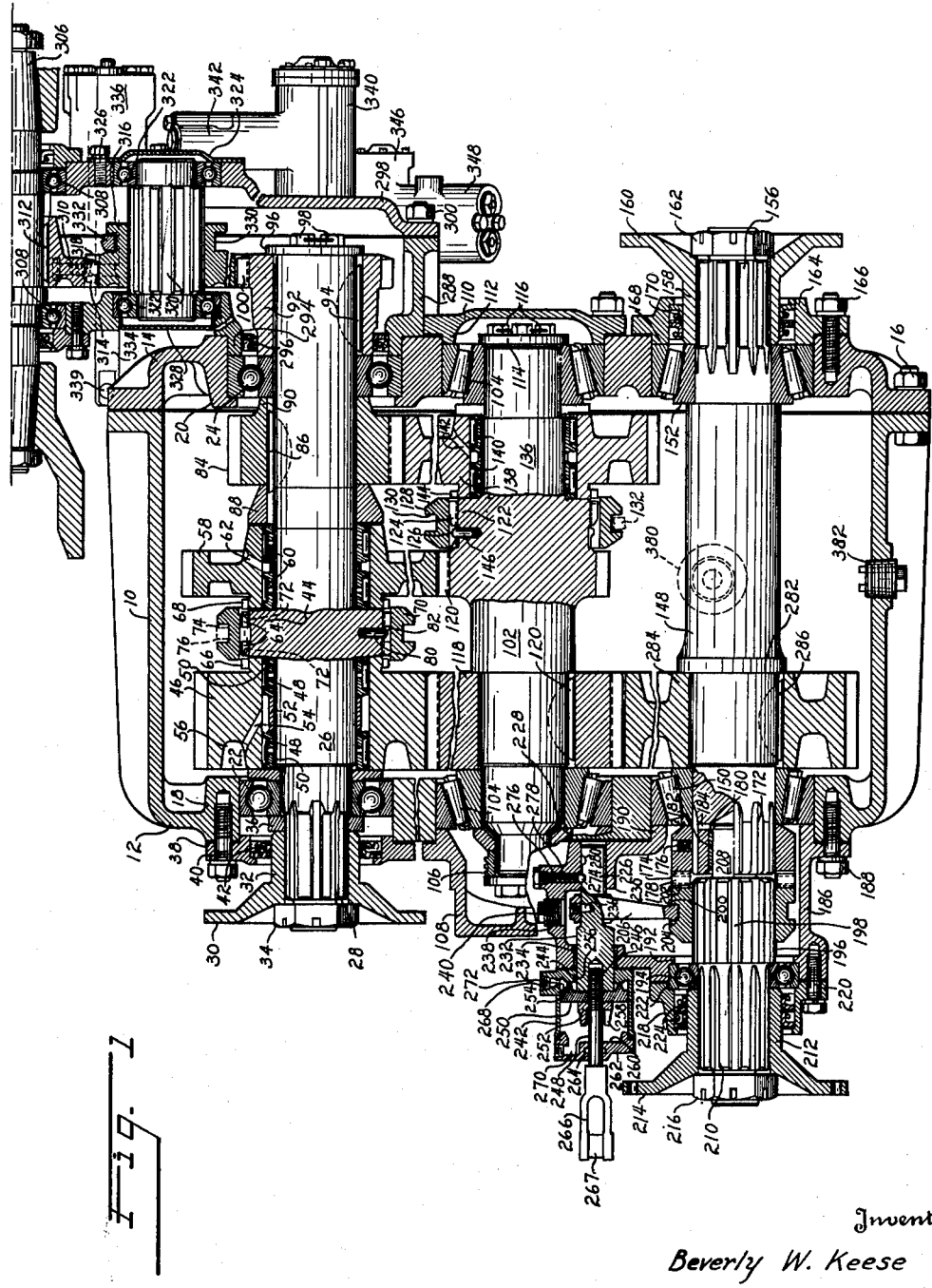
Figure 1 is a vertical longitudinal section taken substantially on the line 1—1 of Figure 2.

Referring in further detail to the drawings, the power transfer gearing to be presently described in detail is enclosed within a suitable housing structure, which in the present instance includes the housing body 10 closed at one of its ends by a wall 12 and open at its other end. This open end of the housing body is flanged and a cover member 14 is detachably secured thereto by means of bolts indicated at 16.

Adjacent their upper ends, the housing wall 12 and the cover member 14 are formed with the hollow bosses 18 and 20 respectively, receiving the anti-friction bearings 22 and 24, in which the power input shaft 26 is journalled. This shaft at one of its ends has a reduced splined extension 28 projecting externally of the housing and upon the same the internally splined hub 32 of a universal joint flange 30 is engaged and held against axial movement by means of the nut 34 threaded on the end of said shaft. The inner end of the hub 32 is engaged with a spacing washer 36 on the shaft section 28 which bears against the inner race ring of the bearing 22. The outer open end of the boss 18 is closed by means of the cap plate 38 secured to the housing wall by bolts 40 and carrying a conventional lubricant seal 42 surrounding the hub 32. The motor driven shaft is adapted to be connected to the flange 30 in the conventional manner.

In spaced relation from the bearing 22, the shaft 26 is formed with a diametrically enlarged section 44. Between the enlarged section of the shaft and bearing 22, a wide gear member 46 is loosely mounted to rotate relative to the shaft upon the axially spaced anti-friction bearing rollers 48 mounted in the cage rings 50 which are held in axially spaced apart relation by the spacer ring 52. The gear is formed with an oil duct 54 leading from an annular cavity 56 in one side of the gear to the space between the roller bearings 48.

A second narrow gear 58 of greater diameter than the gear 46 is also mounted at the opposite side of the shaft enlargement 44 for rotation relative to said shaft upon the roller bearings 60 which are similar to those just described and to which oil is supplied through the duct 62 formed in the gear. The enlargement 44 of the shaft 26 has formed upon its periphery two axially spaced annular series of teeth 64, and the opposing end of each of the gears 46 and 58 is provided with a similar series of clutch teeth 66 and 68 respectively of the same diameter as the teeth 64. A shiftable clutch collar 70 is provided with internal clutch teeth 72 slidably engaged with the teeth 64 and which are adapted to intermesh with the clutch teeth 66 and 68 when said collar is shifted in the appropriate direction to selectively connect the gears 46 and 58 with the shaft 26 for unitary rotation therewith. The collar 70 is formed with an external annular groove 74 to receive the arms of a shifting fork 76 which is fixed to a shifter rod 78 supported at its ends in the housing wall 12 and cover member 14 for axial movement as will be later explained.

The clutch teeth on the shaft and gears and the collar 70 may be of the construction described in United States Letters Patent No. 2,398,407, issued April 16, 1946, so that, in the shifting of the clutch collar to engaged position the confronting end faces of the teeth thereon and on the gear are disposed in relative sliding abutting contact in a common surface of revolution until a condition of substantial synchronism is reached, when the teeth on the clutch collar will then smoothly move without jerk or clash into full meshed engagement with the teeth on the gear. Also, as disclosed in said patent, certain of the teeth on the clutch collar may be provided with inclined end faces for engagement by spring pressed detents 80 carried by the enlargement 44 of the shaft 26 to urge the clutch collar to its final fully meshed position, and free said collar from frictional contact with the shifting fork 76. Also the clutch collar may be internally provided centrally thereof with notched lugs 82 for engagement by the detents 80 to hold said collar in its neutral position against casual axial movement into frictional contact with the side faces of the arms of fork 76.

In spaced relation to the gear 58, a gear 84 of relatively small diameter is keyed to the shaft 26 as shown at 86 and held against axial movement in one direction by means of the spacing collar 88 surrounding said shaft between one side of the gear and the adjacent cage ring for one of the bearings 60. At its opposite side, the gear 84 is formed with the hub extension 90 abutting the inner race ring of bearing 24. With the outer side of said race ring, the inner end of a sleeve 92 secured to shaft 26 by the key 94 is in contact. This sleeve is held against axial movement outwardly on the end of shaft 26 by means of the plate 96 engaged with the end face of the sleeve and secured to the shaft end by means of bolts 98. This end of the sleeve is formed with a drive pinion 100 for the power take-off device to be later described.

Below the power input shaft 26, and transversely offset from a vertical plane containing the axis of said input shaft, a countershaft 102 is journalled at its opposite ends in anti-friction bearings 104 of the tapered roller type mounted in openings provided in the housing end wall 12 and cover member 14. One end of this shaft is provided with speedometer drive means 106 enclosed within the hollow cap member 108 which is securely bolted to the housing wall 12. The cap plate 110 bolted to the cover member 14 has a flange 112 bearing against the outer race ring of the adjacent bearing 104 while the end of the inner race ring is engaged by the retaining plate 114 secured to the end of shaft 102 by the bolts 116.

To a diametrically reduced section of the shaft 102, gear 118 is fixed for rotation therewith by means of the key 120, said gear abutting the inner race ring of the adjacent bearing 104 and being held against axial movement thereby and by the shoulder formed by the reduced part of the shaft 102. This gear 118 is in constant mesh with the teeth of gear 46 on the input shaft 26.

The intermediate section of shaft 102 of the largest diameter has a small diameter gear 120 integrally formed therewith and in constant mesh with the teeth of the large gear 58 mounted on the input shaft 26. The shaft enlargement 122 at one side of the gear 120 is provided on its periphery with teeth 124 slidably engaged by the internal teeth 126 of an axially shiftable clutch collar 128. This collar is provided with a peripheral groove 130 which receives the arms of the fork 132 fixed to the fork shifting rod 134 mounted in the housing end wall 12 and cover member 14 below and in parallel relation with the shifter rod 78 for the clutch collar 76. Upon a reduced diameter section 136 of the countershaft a gear 138 is rotatably supported on the spaced sets of roller bearings 140 which are similar to the above described bearings 48 and 60 and are supplied with lubricant through the duct 142 in said gear. This gear is provided on the end adjacent the clutch collar 128 with an annular series of clutch teeth 144 with which the internal teeth 126 on the collar are adapted to intermesh. These clutch teeth are of the same construction as those provided on the collar 70 and gears 46 and 58 and operate in the same manner to provide a smooth non-clashing intermeshing engagement between the teeth of the clutch collar 128 and gear 138. The shaft enlargement 122 carries detents indicated at 146 to engage the inclined ends of certain of the teeth on the clutch collar to urge the same to its fully meshed position.

Below the countershaft is journalled at its opposite ends in the anti-friction bearings 150 and 152 respectively mounted in the housing wall 12 and cover member 14. The end of the shaft which projects beyond the bearing 152 is splined as at 156 to receive the internally splined hub 158 of the universal joint flange 160. At its inner end the hub contacts the inner race ring of bearing 152 and is held against axial outward movement on the shaft by means of the nut 162 threaded upon a reduced end portion of the shaft. With the flange 160, the usual propeller shaft for transmitting power to the rear drive axle of the vehicle is adapted to be connected. A cap plate or closure 164 is secured to the cover member 14 by suitable bolts indicated at 166 and is formed with a flange 168 extending into the bearing receiving opening in said end member in contact with the outer end face of the outer race ring of bearing 152. This cap member carries the lubricant seals 170 engaged with the periphery of hub 158.

The other end of the output shaft 148 projecting beyond bearing 150 is also splined as at 172 to receive the internally splined clutch member 174 rigidly fixed thereto by the set screw 176. This clutch member at one end abuts the outer end of the inner race ring of bearing 150 and at its other end is formed with an annular series of clutch teeth 178 projecting axially therefrom beyond the end face of shaft 148. This end of the shaft is also formed with a coaxial cylindrical recess 180 in which a bearing bushing 182 is fitted and lubricant passing through the bearing 150 is supplied thereto through one or more radial apertures 184 opening at their outer ends into the spaces between the splines 172.

To the housing wall 12, a casing 186 is securely bolted as at 188, this end of the casing being formed with a flange 190 extending into the opening in the housing wall and contacting the outer end of the outer race ring of bearing 150.

The outer end wall of the casing 186 is provided with a counterbored opening 192 to receive the anti-friction bearing 194 in which a stub shaft 196 is journalled. This shaft includes a large diameter section extending inwardly from the bearing 194 and externally splined as at 198 with which the internally splined axially shiftable clutch collar 200 is engaged. This collar on its inner end is provided with an annular series of clutch teeth 202 for intermeshing engagement with the teeth 178 of the member 174. The confronting end faces of the two series of clutch teeth are of the same construction as those previously referred to so that they will smoothly intermesh without jerk or clash when the clutch collar is shifted to engaged position. This collar is also provided with an external annular groove 204 to receive the arms of the shifting fork 206.

The bushing 182 in the end of shaft 148 provides a pilot bearing in which the diametrically reduced axial extension 208 of the splined portion 198 of shaft 196 is journalled for free rotation relative to shaft 148.

The outer end of shaft section 198 abuts the inner race ring of bearing 194, said bearing ring being mounted upon the splined outer end section 210 of the stub shaft which receives the internally splined hub 212 of the universal joint flange 214 with which the propeller shaft for a front vehicle drive axle is adapted to be connected. The inner end of hub 212 contacts the inner ring of bearing 194 and it is held against axial outward movement on the shaft by nut 216 threaded upon the reduced end of the shaft.

A hollow cap member 218 is bolted as at 220 to the wall of casing 186, and at the face thereof opposed to said wall is recessed as at 222 to receive the outer edge portion of the outer ring of bearing 194. Cap member 218 is provided with the lubricant seals 224 contacting the periphery of the hub 212.

In the upper end of the casing 186, one end of a fork shifter rod 226 is supported for axial sliding movement in the opening 228 in a boss 230 formed on the top and inner side wall of the casing 186. The opposite end 232 of the rod 226 is of relatively large diameter and is slidably mounted in the bushing 234 in the outer side wall of casing 186. To the rod 226, the fork 206 is rigidly fixed by the set screw 236 and the top wall of casing 186 is provided with an access opening 238 normally closed by the threaded plug 240.

To the casing 186, a cylinder 242 is rigidly secured at one of its ends, said end of the cylinder having an opening 244 through which the part 232 of shifter rod 226 is freely movable. This end of the shifter rod has a threaded axial bore 246 with which the inner threaded end of the rod 248 is connected. A piston 250 has a central opening receiving the threaded end portion of rod 248 and is tightly clamped against the end face of the part 232 of shifter rod 226 by means of a collar 252 threaded on the rod 248. Piston 250 has a flange 254 projecting from one side face thereof adapted for contact with the internal surface 256 on the end wall of cylinder 242 to limit movement of piston 250 and rod 226 in one direction. Movement of said piston and rod in the opposite direction is limited by contact of the studs 258 on collar 252 with the internal surface 260 of the cylinder head 262 which closes the outer end of cylinder 242. This cylinder head is preferably provided with a suitable stuffing box indicated at 264 through which rod 248 extends. The outer end of said rod is provided with a fork 266 to which suitable manually operable means, conventionally indicated at 267 is connected.

In normal operation, the clutch fork shifting rod 226 is fluid pressure operated. As shown, air or other fluid medium is supplied at equal pressure from a reservoir or other supply source through a control unit on the instrument panel or steering post of the vehicle to the inlet ports 268 and 270, respectively, in the inner end of the cylinder wall and in the head 262. When port 270 is connected with the pressure source, the fluid pressure is admitted to the outer end of cylinder 242 and acts against the relatively large outer surface area of the piston 250 to move the same at comparatively low speed to the position shown in Figure 1, and thus shift the rod 226 to the right to engage the teeth of clutch collar 200 with the teeth of the clutch member 174 thereby transmitting power from the output shaft 148 through stub shaft 196 to the front vehicle axle. When it is not desired to drive the front axle, shaft 148 is declutched from the shaft 196 by operating the control unit to release pressure from cylinder 242 through port 270 and supply pressure fluid through the port 268. This pressure can act only against the relatively small annular surface area 272 of the piston 250 between the flange 254 thereon and the cylinder wall. A relatively higher force will thus be initially applied to the piston to rapidly move the same and the rod 226 in the left to the position shown in Figure 6, thereby overcoming torque resistance and quickly disengaging the teeth of collar 200 from the clutch teeth 178 on member 174.

The clutch collar 200 and fork 206 are held in either shifted position by means of the usual latching detent, which in this instance is in the form of a ball 274 in the inner end of a vertical bore 276 in the top wall of casing 186 which is yieldingly urged by spring 278 into seating engagement with the longitudinally spaced concave notches or recesses 280 extending transversely across the upper side of the end portion of rod 276 mounted in the boss 230.

As will be seen from reference to Figure 3 of the drawings, the power output shaft 148 is preferably mounted with its axis disposed in a common vertical plane with the axis of the power input shaft 26. To the shaft 148 between a shoulder 282 thereon and the bearing 150 a gear 284 is keyed as at 286 and is in constant mesh with the gear 118 on countershaft 102. It will thus be understood that the drive gearing and adjustable clutch collars 70 and 128 constitute power transfer mechanism between the input shaft 26 and the output shaft 148.

Upon the upper end of the cover member 14 a power take-off housing is mounted. As herein shown, this housing comprises a body section 288 having a side wall provided with spaced openings to receive threaded studs 290 projecting from cover member 14 and upon which clamping nuts 292 are threaded. This housing wall is formed with an annular boss 294 extending within the opening of the member 14 containing bearing 24 and abutting the outer race ring of said bearing. The end of shaft 26, together with sleeve 92 and gear 100 thereon, are received in the housing body 288 and a conventional type of lubricant seal 296 within the boss 294 contacts the peripheral surface of sleeve 92 at its inner end.

Certain of the studs or bolts fixed in the cover member 14 are relatively long to extend through longitudinal bores in the wall of housing section 288 and openings in the flanged marginal portion of the housing cover 298, the threaded ends of said bolts receiving the clamping nuts 300. The cover member is additionally secured to the marginal flange on the housing section 288 by the spaced bolts 302 and nuts 304.

In the upper end of cover 298 and the opposed side wall of housing 288, a power take-off shaft 306 of conventional form is journalled by the anti-friction bearings 308. Suitable connections are provided at one or both ends of this shaft for operative connection with drive means for an auxiliary machine. Upon the shaft 306 within the housing a gear 310 is keyed at 312 and suitably secured against axial movement thereon. The teeth 314 of this gear have flat end faces for sliding abutting contact with the confronting end faces on the teeth 318 of the axially shiftable gear 316 having splined sliding engagement with a countershaft 320 journalled at its opposite ends by the anti-friction bearings 322 mounted in the side wall of housing section 288 and cover member 298 respectively. A cover plate 324 for the outer end of shaft 320 and the associated bearing 322 is secured to the face of the housing cover 298 by bolts 326. The opening in the wall of housing section 288 for the other end of shaft 320 and associated bearing 322 is closed by a cupped or flanged cover plate 328 fitted within said opening.

The teeth of the gear 100 fixed to the end of input shaft 26 are of similar form and construction to the gear teeth 314 and 318 so that when the gear 316 is shifted in one direction the teeth thereof will simultaneously mesh with the teeth of the gear 100 and gear 310 in the manner above explained.

The gear member 316 is provided with an annular groove 330 to receive the arms of a fork 332 fixed to the axially shiftable rod 334 mounted at its ends in the housing section 288 and cover member 298. To this cover member, a cylinder and piston assembly, generally indicated at 336, is attached by the bolts 338 and operatively connected with one end of the rod 334. This mechanism, which is substantially identical with the fluid pressure operated mechanism for the shiftable clutch member 200 between the shafts 148 and 196, operates in a similar manner to axially shift the gear member 316 on the shaft 320 into and out of intermeshed relation with the teeth of the gears 100 and 310.

To the other forked end of the rod 334 manually operable means conventionally indicated at 339 is connected and detent means similar to that above described is also provided for yieldingly holding the fork shifter rod 334 in its shifted position.

From reference to Figure 2 of the drawings it will be noted that the power take-off housing is disposed at an inclination relative to the vertical centerline of the housing structure 10 and the axes of the power take-off shaft 306 and countershaft 320 are located in a common plane disposed at an angle of substantially forty-five degrees with respect to a horizontal plane intersecting the axis of the power input shaft 26. Thus the power take-off shaft will be conveniently located adjacent one side of the vehicle frame. In counterbalancing relation thereto, fluid pressure operated actuating units for the respective clutch fork shifter rods 78 and 134 are rigidly mounted upon the housing cover member 14, thus more or less equally distributing stress forces upon the cover attaching bolts 16.

The actuating unit for the shifter rod 78 includes a cylinder 340 and piston mechanism reciprocating therein together with an associated pressure operated valve mechanism 342 connected with the selective control unit on the steering post or instrument panel of the vehicle for governing the supply of pressure fluid to cylinder 340 from a manifold 344 suitably connected with a reservoir or other source of fluid pressure supply.

Similarly the actuating unit for the clutch fork shifter rod 134 includes a cylinder 346 having piston mechanism reciprocating therein and the associated valve mechanism 348 connected with the selector control unit to govern the supply of pressure fluid from manifold 344 to cylinder 346 with respect to the piston mechanism therein. As the piston and cylinder assemblies with their associated valve mechanisms and the selector control unit are of well known construction and constitute no essential part of the present invention, detail description thereof is not believed to be necessary.

Referring now to Figure 4 of the drawing, the right hand ends of the clutch fork shifter rods 78 and 134 are slidably mounted in spaced bores extending through an internal boss 350 formed on the cover member 14. The rods or stems of the pistons operating in the respective cylinders 340 and 346 are connected to rods 78 and 134 in a similar manner. Thus the end of each fork shifter rod is provided with a concentric cylindrical recess 352, the wall of which is internally threaded as at 354. The piston rod or stem 356 has an annular enlargement or head 358 on its end of somewhat less diameter than the recess 352. An annular externally threaded nut 357 is of greater internal diameter than the piston stem 356 and adjustably coacts with the threads 354 to engage the inner face of the head 358 and tightly clamp the same against the base wall of the recess 352. The outer end of this recess is closed by washer plate 351. It will thus be apparent that a rigid connection betwen the work shifter rod and the piston stem may be easily and quickly made, although said rod and stem may be slightly out of true axial alignment.

Between the two fork shifter rods 78 and 134, the boss 350 on the housing cover member is provided with a bore 359 extending radially between the rod and receiving bores in said boss and communicating therewith. A ball detent 360 in the lower end of this bore 359 engages in either one of the two axially spaced concave seats or recesses 362 provided in the upper part of the fork shifting rod 134. A similar ball detent 364 is adapted for latching engagement in any one of the three axially spaced concave seats or recesses 365 provided in the lower side of the work shifter rod 78. A common spring element 366 in bore 359 yieldingly urges the ball detents 360 and 364 in opposite directions to their latching positions. Before the upper fork shifting rod 78 is mounted in the housing end member 14, the detent balls 360 and 364 and spring 366 may be readily inserted through the opening 368 in the upper end of the boss 350, which is then closed by the threaded plug 370.

Each fork shifter rod 78 and 134 at the left hand end thereof is forked and connected with manually operable means conventionally illustrated at 372 and 374, respectively.

From the foregoing description, the construction and manner of operation of the present invention will be readily understood. In Figure 1 of the drawings, the clutch collars 70 and 128 are shown in their disengaged or neutral positions. Thus, rotation will not be transmitted from the power input shaft 26 to the output shaft 148 but as shown in this figure actuator unit 336 has been operated to shift the clutch collar and gear member 316 into meshed engagement with the teeth of gears 100 and 310 so that rotation is transmitted to the power take-off shaft 306 and gear element 138 is idly rotated on the stationary countershaft 102.

For the direct transmission of power from the input shaft 26 through output shaft 148 to the vehicle axles, the selector lever is properly positioned to cause operation of the actuator unit 340 for the shifter rod 78, whereby clutch collar 70 is shifted from its neutral position, as shown in Figure 1, to the left and the clutch teeth thereof are intermeshed with clutch teeth 66 on the gear 46. This gear now rotates as a unit with the shaft 26, and through the gears 118 and 284 transmits rotation at the same speed to the power output shaft 148.

For the overdrive transmission of power from input shaft 26 to the vehicle axles, the selector lever is positioned to cause operation of the unit 340 so that clutch collar 70 will be shifted to the right from neutral position and the clutch teeth thereof engaged with clutch teeth 68 on the large gear 58, thus connecting this gear to shaft 26 for unitary rotation therewith. Gear 58 being in mesh with small gear 120 on countershaft 102 transmits rotation through gears 118 and 284 to the power output shaft 148 at relatively high speed. Of course, when the direct drive connection is made, gear 58 will be idly rotated relative to the input shaft 26 while, when the overdrive connection is made, gear 46 will be rotated relative to the input shaft. By proper adjustment of the operator's selector lever, actuator unit 340 may be operated to return clutch collar 70 from either of its drive positions to the neutral position where it is disengaged from clutch teeth of both gears 46 and 58.

When it is desired to establish an underdrive condition, the operator's selector lever is set to cause operation of the actuator unit 346 and axially shift clutch collar 128 to the right from the position shown in Figure 1 and engage the clutch teeth thereof with clutch teeth 144 on gear 138, thereby connecting the gear to countershaft 102 for unitary rotation therewith. Power will then be transmitted from the fixed gear 84 on input shaft 26, through gear 138, the countershaft 102 and gears 118 and 284 to power output shaft 148, at a relatively low speed. With clutch collar 70 in the neutral position, both gears 46 and 58 will then be idly rotated relative to the input shaft 26.

In each of the above described driving conditions of the power transfer mechanism, with clutch collar 200 in the engaged position shown in Figure 1, rotation is transmitted to the front and rear drive axles of the vehicle at the same speed through the driving connections with shafts 148 and 196. The transmission of driving power to the front vehicle axle may be discontinued at any time by the admission of pressure fluid through cylinder part 268 to exert a high pressure force against piston surface 272 shifting rod 226 and fork 206 to the left and applying a high thrust pressure force to the collar 200 to disengage the clutch teeth thereof from the clutch teeth of member 174. By the application of differential pressure forces moving piston 250 in opposite directions as above explained, different axial thrust forces are applied to the clutch collar 200 in the clutching and declutching operations thereof so that, in the movement of the clutch collar to engaged position, the confronting end surfaces of the clutch teeth 202 and 178 will be brought into abutting sliding contact under relatively light pressure while a sufficiently high disengaging pressure is applied to the clutch collar to overcome driving torque forces and quickly disengage the teeth on said collar from the teeth 178 on member 174.

When the gear member 316 is in engaged position to transmit power to the power take-off shaft 306 and clutch collars 70 and 128 are in neutral position, the countershaft 102 remains stationary, and the only rotating gear elements are gears 84 and 138. Thus excessive wear of the elements of the power transfer gear train is reduced to a minimum. When power is being transmitted to the output shaft 148, member 316 is axially shifted out of engagement with the gears 100 and 310 so that the power take-off will not be operated. However, the power take-off shaft may also be operated simultaneously with the transfer of driving power between the input and output shafts for the operation of accessories mounted on the vehicle or a machine carried by a trailer vehicle.

The housing structure 10 of the transfer case is provided in one of its side walls with an oil filler opening normally closed by a suitable plug and in the bottom wall thereof with a drainage opening normally closed by plug 382. The oil is picked up by the teeth of the power transfer gear train and is distributed therefrom through various passages to the several shaft and gear bearing units.

In the event of failure of any one of the fluid pressure operated actuator units for the several clutch devices, said devices may be operated independently of said actuator units by the manually operable means connected to the clutch fork shifter rod.

From the foregoing description considered in connection with the accompanying drawings, it is believed that the construction, manner of operation and several advantages of my improved power transfer case will be readily understood. It will be seen that I have provided a simple, compact and efficiently operating mechanism for the direct, overdrive or underdrive transmission of power from the power input shaft to the vehicle axle. I have found that the type of "easy-shift" clutch devices herein described for transmitting power at the desired speed to the power output shaft are admirably adapted for use in connection with fluid pressure operated actuator units for the shiftable clutch members. Of course, in the operation of such units, the operator has no "feel" of the engaging contact between the confronting series of clutch teeth and cannot control the movement of the shiftable clutch collar to engaging position. Therefore, when a conventional type of clutch tooth construction is employed and the clutch collar is shifted by a fluid pressure operated unit, owing to the heavy fluid pressure applied to the clutch collar and torque forces, in the initial partial intermeshing engagement between the two series of clutch teeth, serious damage or mutilation of the clutch teeth is likely to occur. This possibility is avoided in the improved "easy-shift" type of clutch, by reason of the abutting sliding contact of the confronting end faces of the two series of clutch teeth in a common plane of revolution until the rotating speeds of the two series of teeth are substantially in synchronism, when under the fluid pressure the teeth on the clutch collar will smoothly move to full intermeshing engagement with the clutch teeth on the gear element. It will thus be evident that the present invention provides a fluid pressure operated clutch in the transfer case whereby a substantially noiseless, non-clashing driving connection may be established between the driving and driven elements.

It will further be seen that the present invention provides a power take-off unit with fluid pressure operated means for establishing a driving connection between the power take-off shaft and one end of the power input shaft of the transfer case and which is operable independently of the power transfer gear train between the input and output shafts. The fluid pressure operated clutch means for optionally establishing a driving connection between the power output shaft and the front vehicle axle is also an important feature of the invention.

Finally, it will be appreciated that, in view of the manifold functions and purposes of the present invention, I have provided a very compact organization of the several parts in a transfer case of minimum dimensions and in which the cooperating elements are of rugged and durable structural form for prolonged efficient functional operation at comparatively low maintenance expense.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a power transfer case, power input and output shafts and an intermediate countershaft, direct and overdrive power transmitting connections between the power input and output shafts, comprising axially spaced gears fixed to the countershaft, direct and overdrive gears rotatably mounted on the power input shaft and in constant mesh with the respective gears on the countershaft, a gear fixed to the output shaft in mesh with the countershaft gear engaged with said direct drive gear, and clutch means comprising a clutch collar rotatable with the input shaft between the direct and overdrive gears thereon and axially shiftable to selectively engage clutch means on the respective gears and connect the same for unitary rotation with the input shaft.

2. In a power transfer case, a housing, power input and output shafts and a countershaft mounted in the housing, direct, overdrive and underdrive power transfer means including axially spaced gears rotatably mounted on the input shaft and a gear rotatably mounted on the countershaft, clutch means comprising an axially shiftable collar rotatable with the input shaft between said spaced gears, an actuator unit having fluid pressure operated means operatively connected to said clutch collar to axially shift the same and selectively connect said gears to the input shaft for unitary rotation therewith, an axially shiftable clutch collar rotatable as a unit with the countershaft to engage clutch means on the gear on said shaft and connect the same therewith for unitary rotation, and a second actuator unit having fluid pressure operated means operatively connected to said second clutch collar to independently shift the same to engaged and disengaged positions.

3. The power transfer case as defined in claim 2, in which said housing includes a detachable end cover section and said clutch actuator units are mounted on said cover section externally of the housing.

4. In a power transfer case, a housing, power input and output shafts mounted therein, power transfer mechanism operatively connecting said shafts, said mechanism including an axially shiftable clutch member, a shifting fork engaged therewith, an axially movable fork shifter rod mounted in the housing and connected to said shifting fork, an external actuator unit separably mounted on one end of the housing and having a fluid pressure operated piston and a piston rod substantially coaxial with said shifter rod, and means connecting said rods in longitudinally rigid force transmitting relation, said means having sufficient radial clearance with one of said rods to compensate for any small axial misalignment between said rods.

5. In a power transfer case, a housing having a body section and a detachable cover section closing one end thereof, input and output shafts mounted in vertically spaced relation in said housing, power transfer mechanism operatively connecting said shafts, said mechanism including independently operable clutches each having a shiftable clutch member, a power take-off unit mounted upon said cover section of the housing and having a power take-off shaft and drive means between said shaft and one end of the power output shaft disposed at one side of a vertical plane which includes the axis of the input shaft, and actuator units for said shiftable clutch members mounted on the housing cover section at the opposite side of said plane.

6. In a power transfer case, a housing body, a cover closing one end of said body, vertically spaced power input and output shafts journalled at opposite ends in said housing body and cover respectively; a power take-off unit comprising a separate housing detachably mounted on said cover, a power take-off shaft journalled in said separate housing, means for releasably establishing a driving connection between said power take-off shaft and the end of the power input shaft journalled in said cover including an axially shiftable power transmitting member mounted in the power take-off housing and an axially shiftable rod operatively connected with said member, and an actuator unit mounted on said power take-off housing comprising a fluid pressure operated piston, and means directly and rigidly connecting one end of said axially shiftable rod to said piston.

7. In combination with a power transfer case having a housing and a shaft journalled therein, a casing enclosing one end of said shaft detachably secured to said housing, a second shaft journalled in said casing in coaxial relation with said end of the first shaft, a clutch member fixed to one of said shafts within the casing, a coacting clutch collar rotatable with the other of said shafts and axially shiftable relative thereto into and out of torque transmitting relation with said fixed clutch member, and an actuator unit mounted on said casing, said unit including a fluid pressure actuated piston, a piston rod, a shifter rod connected at one end to said clutch collar, and means connected to the other end of said shifter rod for manually actuating said clutch collar independently of fluid pressure.

8. In a power transfer case, a housing, power input and output shafts mounted therein, power transfer mechanism operatively connecting said shafts, said mechanism including an axially shiftable clutch member, a shifting fork engaged therewith, an axially movable shifter rod mounted in said housing and connected to said shifting fork, an actuator unit mounted on one end of said housing and having a fluid pressure operated piston, a rigid force transmitting connection between said piston and one end of said fork shifter rod, and manually operable means connected to the other end of said shifter rod to actuate the same independently of said actuator unit.

9. In a power transfer mechanism, parallel power input and output shafts, a parallel countershaft, spaced gears rotatable on said input shaft, means for clutching either of said gears for rotation with said input shaft, spaced gears on said countershaft constantly meshed with said gears on said input shaft, one of said gears on the countershaft also being constantly geared to said power output shaft to provide a direct drive chain from said input shaft, and further gearing and a clutch interconnecting said input shaft with said countershaft so that said countershaft may be driven from the input shaft when neither of said spaced gears on the input shaft are clutched to the input shaft.

10. In the power transfer mechanism defined in claim 9, a rotatable power take-off shaft and means for selectively connecting said input and take-off shafts for rotation together whereby the latter may be driven from the input shaft when the output shaft is not being driven.

11. In the power transfer mechanism defined in claim 9, a drive shaft journalled coaxially with said output shaft, and means for selectively clutching said drive shaft and output shaft for rotation together.

12. In a power transfer case, power input and output shafts and an intermediate countershaft, direct and overdrive power transmitting connections between the power input and output shafts, comprising axially spaced gears fixed to the countershaft, direct and overdrive gears rotatably mounted on the power input shaft and in constant mesh with the respective gears on the countershaft, a gear fixed to the output shaft in mesh with the countershaft gear engaged with said direct drive gear, clutch means comprising a clutch collar rotatable with the input shaft between the direct and overdrive gears thereon and axially shiftable to selectively engage clutch means on the respective gears and connect the same for unitary rotation with the input shaft, and underdrive means comprising a gear fixed to the input shaft, a gear rotatably mounted on the countershaft in constant mesh with said fixed gear on the input shaft, and independently operable clutch means to establish a driving connection between said rotatable gear on the countershaft and the countershaft when said clutch collar on the input shaft is in neutral position.

13. In combination with a power transfer case including power input and output shafts and a power transfer mechanism connecting said shafts: an additional shaft and bearing means journalling said shaft in coaxial relation with one end of the power output shaft, a clutch member fixed to the output shaft, a coacting clutch collar rotatable with said additional shaft and axially shiftable relative thereto into and out of torque transmitting relation with said fixed clutch member, and an actuator unit mounted on said transfer case operatively connected to said clutch collar and having means for applying axial thrust forces of different magnitude to said collar for shifting said collar into and out of clutched engagement with said fixed clutch member, said actuator unit including a pressure operated piston having opposite areas of different size subject to fluid pressure when the collar is to be shifted in one direction or the other and a clutch fork shifter rod directly connected at one end to said piston, the disengagement force being the greater.

14. In a power transfer case, power input and output shafts and an intermediate countershaft, a plurality of power transmitting connections between the power input and output shafts comprising axially spaced gears of different size fixed to the countershaft, cooperating gears rotatably mounted on the power input shaft and in constant mesh with the respective gears on the countershaft, a gear fixed to the output shaft in constant mesh with one of said countershaft gears, clutch means comprising a clutch collar rotatable with the input shaft between the gears on said input shaft and axially shiftable to selectively engage clutch means on the respective gears on said input shaft and connect the same for unitary rotation with the input shaft, a gear fixed to said input shaft, a gear rotatably mounted on the countershaft in constant mesh with said fixed gear on the input shaft, and an independently operable clutch means to establish a driving connection between said rotatable gear on the countershaft and the countershaft when said clutch collar on the input shaft is in neutral position.

BEVERLY W. KEESE.

REFERENCES CITED

The following references are of record in the file of this patent:

UNITED STATES PATENTS

| Number | Name | Date |
| --- | --- | --- |
| 2,034,778 | Storey | Mar. 24, 1936 |
| 2,131,015 | Sanford et al. | Sept. 20, 1938 |
| 2,163,741 | Weaver | June 27, 1939 |
| 2,263,141 | Peterson | Nov. 18, 1941 |
| 2,341,756 | Avila | Feb. 15, 1944 |
| 2,398,407 | Brownyer | Apr. 16, 1946 |
| 2,450,896 | Kimberly | Oct. 12, 1948 |

FOREIGN PATENTS

| Number | Country | Date |
| --- | --- | --- |
| 501,498 | Great Britain | Feb. 28, 1939 |